United States Patent
Uju et al.

(10) Patent No.: US 11,572,027 B2
(45) Date of Patent: Feb. 7, 2023

(54) BUMPER REINFORCEMENT

(71) Applicants: TOYOTA JIDOSHA KABUSHIKI KAISHA, Aichi-ken (JP); AISIN CORPORATION, Aichi-ken (JP)

(72) Inventors: Shizuma Uju, Nagoya (JP); Jun Shobo, Anjo (JP); Kyosuke Matsui, Anjo (JP); Tomoki Mitsuya, Kariya (JP)

(73) Assignees: TOYOTA JIDOSHA KABUSHIKI KAISHA, Aichi-Ken (JP); AISIN CORPORATION, Aichi-Ken (JP)

( * ) Notice: Subject to any disclaimer, the term of this patent is extended or adjusted under 35 U.S.C. 154(b) by 190 days.

(21) Appl. No.: 17/168,176

(22) Filed: Feb. 5, 2021

(65) Prior Publication Data
US 2021/0245688 A1   Aug. 12, 2021

(30) Foreign Application Priority Data
Feb. 7, 2020  (JP) .............................. JP2020-020186

(51) Int. Cl.
*B60R 19/18* (2006.01)
*B62D 21/15* (2006.01)

(52) U.S. Cl.
CPC ............ *B60R 19/18* (2013.01); *B62D 21/152* (2013.01); *B60R 2019/1806* (2013.01)

(58) Field of Classification Search
CPC .............................. B60R 19/18; B62D 21/152
See application file for complete search history.

(56) References Cited

U.S. PATENT DOCUMENTS

| | | | |
|---|---|---|---|
| 9,932,004 B1 * | 4/2018 | Mihm | B60R 19/18 |
| 2018/0154764 A1 | 6/2018 | Uchida et al. | |
| 2020/0156574 A1 * | 5/2020 | Mitsuya | B62D 25/084 |

FOREIGN PATENT DOCUMENTS

| | | | | |
|---|---|---|---|---|
| DE | 102018221371 A1 * | 10/2019 | ......... | B60R 19/023 |
| JP | 201890060 A | 6/2018 | | |

\* cited by examiner

*Primary Examiner* — D Glenn Dayoan
*Assistant Examiner* — Melissa Ann Bonifazi
(74) *Attorney, Agent, or Firm* — Hauptman Ham, LLP

(57) ABSTRACT

A bumper reinforcement includes a bumper reinforcement body, a first extension portion, a second extension portion, and a weakened portion. The bumper reinforcement body is molded from a synthetic resin material, a length of the bumper reinforcement body extends in a vehicle width direction. The first extension portion is integrally molded with the bumper reinforcement body so as to extend from the bumper reinforcement body toward a vehicle rear side and oppose a vehicle structural member extending in the vehicle width direction from a vehicle front side. The first extension portion is provided within a range spanning from a vehicle width direction side end portion to a position at 40% of an overall vehicle width direction length of a vehicle front end section away from the vehicle width direction side end portion. The second extension portion is integrally molded with the bumper reinforcement body.

2 Claims, 3 Drawing Sheets

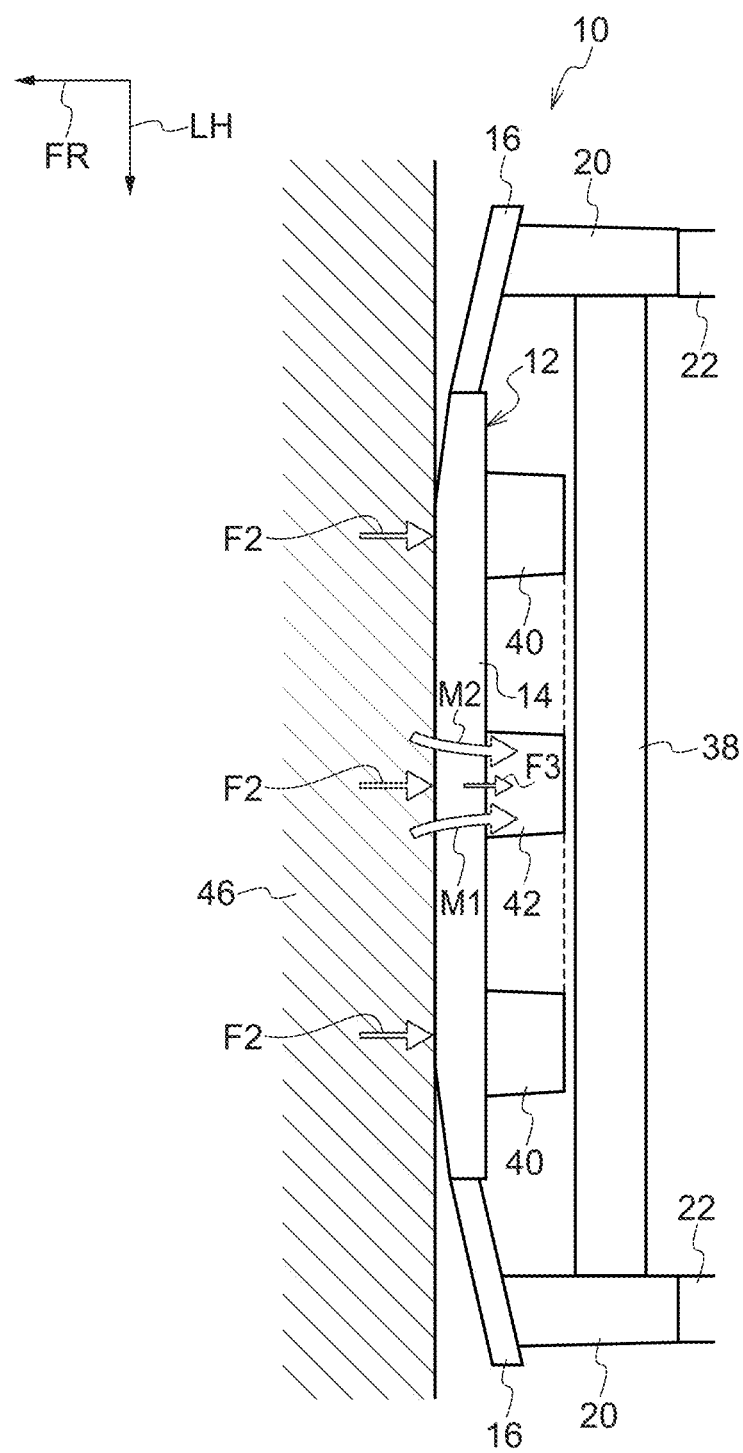

BUMPER REINFORCEMENT

CROSS-REFERENCE TO RELATED APPLICATION

This application is based on and claims priority under 35 USC 119 from Japanese Patent Application No. 2020-020186 filed on Feb. 7, 2020, the disclosure of which is incorporated by reference herein.

BACKGROUND

Technical Field

The present disclosure relates to bumper reinforcement of a vehicle.

Japanese Patent Application Laid-Open (JP-A) No. 2018-90060 discloses an example of a configuration in which vehicle upper side bumper reinforcement and vehicle lower side bumper reinforcement are connected together by support members disposed at a predetermined spacing in a vehicle width direction with their length running in substantially a vehicle vertical direction. Shutter blades are provided between the two bumper reinforcements in a ventilation space between support members that neighbor each other in the vehicle width direction. The shutter blades are capable of turning about an axis having an axial direction running in the vehicle width direction, and a projection surface area of the shutter blades as viewed along the vehicle front-rear direction can be increased and decreased by this turning of the shutter blades.

Increasing the projection surface area of the shutter blades as viewed along the vehicle front-rear direction reduces the opening area of the ventilation space, while decreasing the projection surface area of the shutter blades as viewed along the vehicle front-rear direction increases the opening area of the ventilation space. The flow rate of airflow from the vehicle front side toward the vehicle rear side of the ventilation space can be adjusted by increasing and decreasing the opening area of the ventilation space in this manner. Namely, the configuration disclosed in JP-A No. 2018-90060 is a configuration in which what is referred to as a grille shutter is integrated with bumper reinforcement.

Integrally molding such an integral configuration configured of the grille shutter and the bumper reinforcement from a synthetic resin material has been considered. Vehicle collisions involving the vehicle front side include various collision modes such as full overlap frontal collision modes and offset collision modes. If bumper reinforcement is formed by being molded from a synthetic resin material, it becomes difficult to set a mechanical strength, for example bending strength and compressive strength, that will satisfy the requirements of such collision modes.

SUMMARY

The present disclosure obtains synthetic resin bumper reinforcement having a mechanical strength that is compatible with various collision modes.

A bumper reinforcement of an aspect of the present disclosure includes a bumper reinforcement body, a first extension portion, a second extension portion, and a weakened portion. The bumper reinforcement body is molded from a synthetic resin material, a length of the bumper reinforcement body extends in a vehicle width direction. The first extension portion is integrally molded with the bumper reinforcement body so as to extend from the bumper reinforcement body toward a vehicle rear side and oppose a vehicle structural member extending in the vehicle width direction from a vehicle front side. The first extension portion is provided within a range spanning from a vehicle width direction side end portion to a position at 40% of an overall vehicle width direction length of a vehicle front end section away from the vehicle width direction side end portion. The second extension portion is integrally molded with the bumper reinforcement body so as to extend from the bumper reinforcement body toward the vehicle rear side and oppose the vehicle structural member extending in the vehicle width direction from the vehicle front side. The second extension portion is provided further toward a vehicle width direction center than the range spanning from the vehicle width direction side end portion to the position at 40% of the overall vehicle width direction length of the vehicle front end section. The weakened portion is provided at the bumper reinforcement body between the first extension portion and the second extension portion and has a lower bending strength with respect to load acting in a vehicle front-rear direction than the first extension portion and the second extension portion.

The bumper reinforcement of this aspect of the present disclosure is formed from a synthetic resin material. This enables a reduction in weight in comparison to a bumper reinforcement made of metal. Moreover, the first extension portion and the second extension portion of the bumper reinforcement extend toward the vehicle rear side from the bumper reinforcement body that is long in the vehicle width direction. The first extension portion and the second extension portion oppose the vehicle structural member such as a vehicle frame member that is long in the vehicle width direction from the vehicle front side. The weakened portion is configured on the bumper reinforcement body between the first extension portion and the second extension portion. The weakened portion is set with lower bending strength with respect to load in the vehicle front-rear direction than the first extension portion and the second extension portion.

A formation position of the first extension portion is set within the range spanning from the vehicle width direction side end portion of the vehicle front side end section of the vehicle to the position at 40% of the overall vehicle width direction length of the vehicle front side end section toward the vehicle width direction center. Thus, as long as the first extension portion has the mechanical strength (bending strength and compressive strength) to withstand vehicle offset collision testing, load coming from the vehicle front side through the bumper reinforcement body is transmitted to the first extension portion as axial force toward the vehicle rear side.

In this state, when the bumper reinforcement body deforms under the load from the vehicle front side, and the first extension portion is moved toward the vehicle rear side together with the bumper reinforcement body so as to abut the vehicle structural member, the load transmitted to the first extension portion as axial force can be transmitted to the vehicle structural member, thereby enabling the load to be supported by the vehicle structural member.

A formation position of the second extension portion is set further to the vehicle width direction center than the range spanning from the vehicle width direction side end portion of the vehicle front side end section of the vehicle to the position at 40% of the overall length of the vehicle front side end section toward the vehicle width direction center. In this bumper reinforcement, the first extension portion is provided on both vehicle width direction sides of the bumper reinforcement body. Thus, when the two first extension portions abut the vehicle structural member and are supported by the vehicle structural member in vehicle full overlap frontal collision testing, rotational moments toward the vehicle rear side and the vehicle width direction center act on the bumper reinforcement body between the two first extension portions, the rotational moments being centered on vehicle front ends of the two first extension portions.

When rotational moments act on the bumper reinforcement body in this manner, the bumper reinforcement body undergoes deformation. As long as the second extension portion has the mechanical strength (bending strength and compressive strength) to withstand load based on these rotational moments, the load based on these rotational moments is transmitted to the second extension portion as axial force toward the vehicle rear side. In this state, when the bumper reinforcement body deforms under the load from the vehicle front side, and the two first extension portions and the second extension portion are moved toward the vehicle rear side together with the bumper reinforcement body so as to abut the vehicle structural member, the load transmitted to the second extension portion as axial force can be transmitted to the vehicle structural member, thereby enabling the load to be supported by the vehicle structural member.

In this manner, the bumper reinforcement enables the respective mechanical strengths (bending strengths, compressive strengths, and so on) of the bumper reinforcement body, the first extension portion, and the second extension portion to be easily set corresponding to both an offset collision mode and a full overlap frontal collision mode.

A bumper reinforcement of an aspect of the present disclosure may be configured including a grille shutter section that is integrally molded with the bumper reinforcement body so as to be at a vehicle upper side or a vehicle lower side of the bumper reinforcement body. The grille shutter section includes a penetrating portion penetrating the grille shutter section in the vehicle front-rear direction so as to allow passage of an airflow from the vehicle front side, and is provided with a shutter device that is capable of increasing and decreasing an opening area of the penetrating portion.

In the bumper reinforcement with the above configuration, the grille shutter section is provided at the vehicle upper side or the vehicle lower side of the bumper reinforcement body. The grille shutter section includes the penetrating portion, thereby enabling airflow from the vehicle front side to flow toward the vehicle rear side through the penetrating portion. The grille shutter section is also provided with the shutter device. Increasing or decreasing the opening area of the penetrating portion using the shutter device enables the airflow passing through the penetrating portion to be increased or decreased accordingly.

Note that in such a configuration, the grille shutter section is integrally molded with the bumper reinforcement body. This enables the number of components to be reduced, and also enables the number of vehicle assembly processes to be reduced.

A bumper reinforcement of an aspect of the present disclosure may be configured such that a portion of the bumper reinforcement body further toward a vehicle width direction outer side than the first extension portion is disposed at the vehicle front side of a crash box and opposes the crash box. The crash box is configured to deform in cases in which load from the vehicle front side exceeds a predetermined magnitude. The vehicle width direction outer side portion of the bumper reinforcement body is capable of transmitting load from the vehicle front side through the crash box to a second vehicle structural member provided at the vehicle rear side of the crash box and configured with a higher mechanical strength with respect to load from the vehicle front side than the crash box.

In the bumper reinforcement with the above configuration, the portion of the bumper reinforcement body at the vehicle width direction outer side of the first extension portion is disposed at the vehicle front side of the crash box and opposes the crash box. Thus, for example, if the first extension portion and the second extension portion undergo compression deformation toward the vehicle rear side in an offset collision or a full overlap collision, load toward the vehicle rear side is transmitted to the crash box through the bumper reinforcement body.

The second vehicle structural member configured with a higher mechanical strength with respect to load from the vehicle front side than the crash box is provided at the vehicle rear side of the crash box, and the crash box is connected to the second vehicle structural member. Thus, load toward the vehicle rear side transmitted from the bumper reinforcement body to the crash box can be transmitted from the crash box to the second vehicle structural member.

Thus, even if the load is of a magnitude that causes the first extension portion and the second extension portion to deform, the load can be supported by the second vehicle structural member. Moreover, when the load from the vehicle front side transmitted from the bumper reinforcement body exceeds a predetermined magnitude, the crash box undergoes compression deformation. In this state, the load is partially absorbed in the deformation of the crash box, enabling the load transmitted to the second vehicle structural member to be reduced.

As described above, the bumper reinforcement of aspects the present disclosure can be imparted with a mechanical strength compatible with various collision modes, even when formed from a synthetic resin material.

BRIEF DESCRIPTION OF THE DRAWINGS

Exemplary embodiments of the present invention will be described in detail based on the following figures, wherein:

FIG. 3 is a plan view illustrating bumper reinforcement during full overlap frontal collision testing.

DETAILED DESCRIPTION

Figure 1:
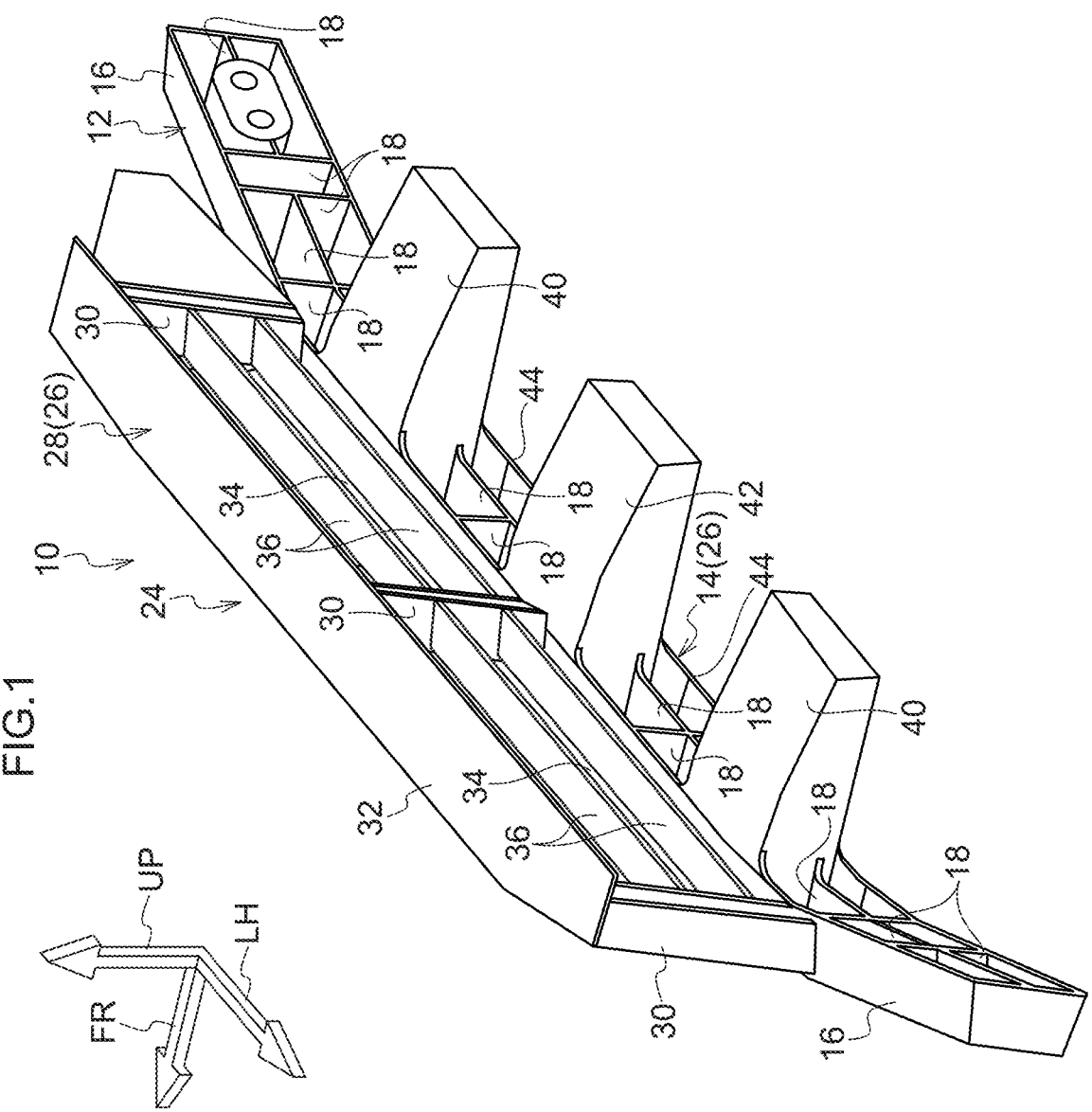
FIG. 1 is a perspective view illustrating bumper reinforcement according to an exemplary embodiment of the present disclosure as viewed from a vehicle rear left side.
Figure 2:
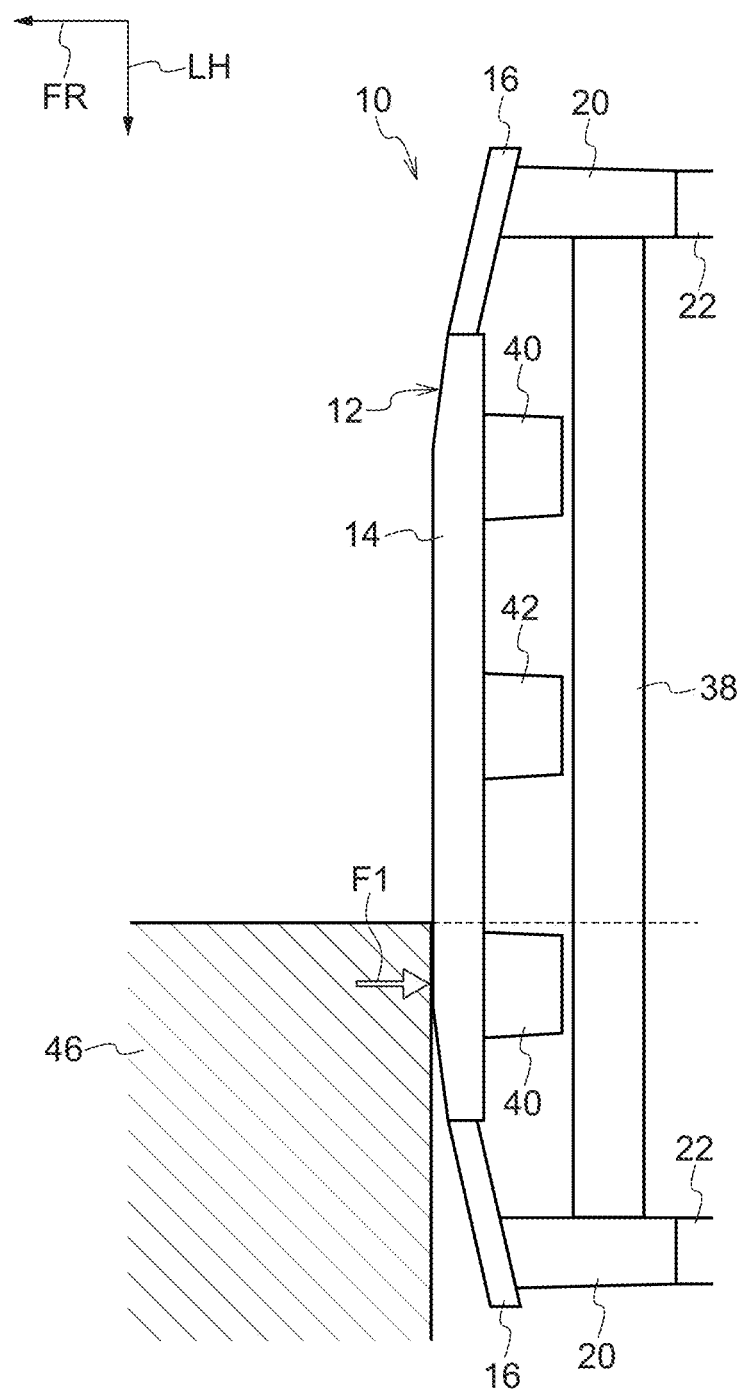
FIG. 2 is a plan view illustrating bumper reinforcement during offset collision testing.

Explanation follows regarding an exemplary embodiment of the present disclosure, with reference to FIG. 1 to FIG. 3. Note that in the respective drawings, the arrow FR indicates a vehicle front side, the arrow UP indicates a vehicle upper side, and the arrow LH indicates a vehicle left side (vehicle width direction left side) of a vehicle applied with bumper reinforcement 10 (or a grille shutter section 24) according to the present exemplary embodiment as appropriate.

Configuration of Present Exemplary Embodiment

As illustrated in FIG. 1, the entire bumper reinforcement 10 is integrally molded from a synthetic resin material. The bumper reinforcement 10 includes a bumper reinforcement body 12. The bumper reinforcement body 12 includes a bumper reinforcement body base 14. The bumper reinforcement body base 14 has a length direction extending substantially in a vehicle width direction (toward the arrow LH side and the opposite side thereto in FIG. 1). Bumper reinforcement body side sections 16 are formed on both vehicle width direction sides of the bumper reinforcement body base 14. The bumper reinforcement body side section 16 on the vehicle left side extends from a vehicle left side end of the bumper reinforcement body base 14 toward the vehicle rear left side, and the bumper reinforcement body side section 16 on the vehicle right side extends from a vehicle right side end of the bumper reinforcement body base 14 toward the vehicle rear right side.

A cross-section profile of the bumper reinforcement body base 14 as sectioned in a direction orthogonal to the length direction of the bumper reinforcement body base 14, and cross-section profiles of the bumper reinforcement body side sections 16 as sectioned in directions orthogonal to the extension directions of the bumper reinforcement body side sections 16 from the bumper reinforcement body base 14 are substantially rectangular. The two bumper reinforcement body side sections 16 and a predetermined location of the bumper reinforcement body base 14 have hollow profiles, and the two bumper reinforcement body side sections 16 and the predetermined location of the bumper reinforcement body base 14 are open toward the vehicle rear side.

The cross-section profiles of the two bumper reinforcement body side sections 16 and the predetermined location of the bumper reinforcement body base 14 thus configure substantially C-shaped profiles open toward the vehicle rear side (the opposite side to the arrow FR in FIG. 1). Reinforcement portions 18 such as ribs are formed as appropriate inside portions where the bumper reinforcement body base 14 and the two bumper reinforcement body side sections 16 are open toward the vehicle rear side in this manner. This sets the mechanical strength (for example bending strength and compressive strength) of the bumper reinforcement body base 14 and the two bumper reinforcement body side sections 16 with respect to for example load from the vehicle front side.

As illustrated in FIG. 2, crash boxes 20 are respectively provided at the vehicle rear side of a vehicle left side end portion of the bumper reinforcement body side section 16 on the vehicle left side and at the vehicle rear side of a vehicle right side end portion of the bumper reinforcement body side section 16 on the vehicle right side. The crash boxes 20 are configured in tube shapes that are open along the vehicle front-rear direction. Outer peripheral cross-section profiles and inner peripheral cross-section profiles of the crash boxes 20 as sectioned along a direction orthogonal to the vehicle front-rear direction of the crash boxes 20 are, for example, substantially rectangular. A vehicle front side end portion of each of the crash boxes 20 is, for example, fixed to the corresponding bumper reinforcement body side section 16 using fastening members such as bolts (not illustrated in the drawings).

A side member 22 serving as a vehicle structural member (second vehicle structural member) is provided at the vehicle rear side of each of the crash boxes 20. The length direction of the side member 22 runs substantially in the vehicle front-rear direction. Vehicle front side ends of the side members 22 oppose vehicle rear side ends of the corresponding crash boxes 20 at the vehicle rear sides of the crash boxes 20. Vehicle rear side end portions of the crash boxes 20 are fixed to the vehicle front side end portions of the corresponding side members 22 using fastening members such as bolts.

As illustrated in FIG. 1, the grille shutter section 24 is provided at a vehicle upper side (on the arrow UP side in FIG. 1) of the bumper reinforcement body base 14. The grille shutter section 24 includes a frame upper section 28 configuring a frame 26. The frame upper section 28 includes three legs 30. One of the three legs 30 is provided to a vehicle width direction left side end portion of the bumper reinforcement body base 14, and another of the three legs 30 is provided to a vehicle width direction right side end portion of the bumper reinforcement body base 14.

The remaining leg 30 out of the three legs 30 is provided at substantially the center between the two legs 30 described above in the vehicle width direction (namely, at a vehicle upper side of substantially the vehicle width direction center of the bumper reinforcement body base 14 of the bumper reinforcement body 12). The legs 30 are integrally molded with the bumper reinforcement body base 14 such that the legs 30 extend from the bumper reinforcement body base 14 toward the vehicle upper side.

A lateral section 32 is provided at a vehicle upper side (on the arrow UP side in FIG. 1) of the legs 30. The lateral section 32 is integrally molded with the bumper reinforcement body base 14. A vehicle width direction left side end portion of the lateral section 32 is connected to a vehicle upper side end portion of the vehicle left side leg 30, and a vehicle width direction right side end portion of the lateral section 32 is connected to a vehicle upper side end portion of the vehicle right side leg 30. Substantially the vehicle width direction center of the lateral section 32 is connected to a vehicle upper side end of the leg 30 provided at substantially the vehicle width direction center of the bumper reinforcement body base 14. In this manner, the frame upper section 28 configured including the three legs 30 and the lateral section 32 configures the frame 26 of the grille shutter section 24 together with the bumper reinforcement body base 14 of the bumper reinforcement body 12.

The inside of the frame 26 is partitioned by the vehicle width direction center side leg 30, and respective spaces on the vehicle left side and the vehicle right side of the of the vehicle width direction center side leg 30 inside the frame 26 configure shutter placement portions 34, serving as penetrating portions. Shutter slats 36 configuring a shutter device are provided inside each of the shutter placement portions 34. The shutter slats 36 have thin and narrow plate shapes, and a length direction of the respective shutter slats 36 runs substantially in the vehicle width direction. Plural of the shutter slats 36 are provided in each of the two shutter placement portions 34.

The shutter slats 36 in the respective shutter placement portions 34 are disposed at a predetermined spacing in the vehicle vertical direction (the arrow UP direction in FIG. 1 and the opposite direction thereto). The shutter slats 36 in the vehicle left side shutter placement portion 34 are each supported by the vehicle left side leg 30 and the substantially vehicle width direction center leg 30 so as to be capable of turning in a direction about an axis having an axial direction running in the vehicle width direction. The shutter slats 36 in the vehicle right side shutter placement portion 34 are each supported by the vehicle right side leg 30 and the substantially vehicle width direction center leg 30 so as to be capable of turning in a direction about an axis having an axial direction running in the vehicle width direction.

The shutter slats 36 are mechanically coupled to an output shaft of a shutter drive device such as a motor, either directly or indirectly through a speed reduction device such as a speed reducing gear train (neither configuration is illustrated in the drawings). The shutter slats 36 thereby turn in a direction about their respective axes having an axial direction running in the vehicle width direction due to rotational force output from the shutter drive device. The projection surface area of the respective shutter slats 36 as viewed along the vehicle front-rear direction increases or decreases as the shutter slats 36 turn about their respective axes having an axial direction running in the vehicle width direction.

As described above, the respective shutter slats 36 are provided in the shutter placement portions 34 configuring spaces inside the frame 26. Accordingly, increasing the projection surface area of the respective shutter slats 36 as viewed along the vehicle front-rear direction decreases an opening area of the shutter placement portions 34, whereas decreasing the projection surface area of the respective shutter slats 36 as viewed along the vehicle front-rear direction increases the opening area of the shutter placement portions 34.

A front grille (not illustrated in the drawings) of the vehicle is provided at the vehicle front side of the grille shutter section 24. A radiator, supported by a radiator support 38 (see FIG. 2) serving as a vehicle structural member, is provided at the vehicle rear side of the grille shutter section 24. An airflow passing through the front grille from the vehicle front side when the vehicle is traveling passes into the frame 26 of the grille shutter section 24, namely through the two shutter placement portions 34 and toward the radiator. Increasing or decreasing the opening area of the shutter placement portions 34 by turning the shutter slats 36 as described above enables the airflow passing through the shutter placement portions 34 to be increased or decreased accordingly.

A pair of first extension portions 40 and a second extension portion 42 are provided at the vehicle rear side of the bumper reinforcement body base 14 of the bumper reinforcement body 12 described above. One of the pair of first extension portions 40 is disposed at the vehicle rear side of a vehicle left side end portion of the bumper reinforcement body base 14. The placement position of this one first extension portion 40 is set within a range spanning from a vehicle left side end of a vehicle front end section of a vehicle body of the vehicle to a position at 40% of the overall vehicle width direction length of the vehicle front end section of the vehicle body away from the vehicle left side end. The other of the pair of first extension portions 40 is disposed at the vehicle rear side of a vehicle right side end portion of the bumper reinforcement body base 14. The placement position of this other first extension portion 40 is set within a range spanning from a vehicle right side end of the vehicle front end section of the vehicle body of the vehicle to a position at 40% of the overall vehicle width direction length of the vehicle front end section of the vehicle body away from the vehicle right side end.

The second extension portion 42 is disposed at the vehicle rear side of a substantially vehicle width direction central portion of the bumper reinforcement body base 14. More specifically, the placement position of this second extension portion 42 is set further to the vehicle width direction center than either the range spanning from the vehicle left side end of the vehicle front end section of the vehicle body to the position at 40% of the overall vehicle width direction length of the vehicle front end section of the vehicle body of the vehicle, or the range spanning from the vehicle right side end of the vehicle front end section of the vehicle body to the position at 40% of the overall vehicle width direction length. The first extension portions 40 and the second extension portion 42 are integrally molded with the bumper reinforcement body base 14 so as to extend continuously from the bumper reinforcement body base 14 toward the vehicle rear side.

Cross-section profiles of the first extension portions 40 and the second extension portion 42 as sectioned in a direction orthogonal to the respective extension directions of the first extension portions 40 and the second extension portion 42 from the bumper reinforcement body base 14 are substantially rectangular, and the first extension portions 40 and the second extension portion 42 are configured in solid block shapes. Vehicle width direction locations of the bumper reinforcement body base 14 between the respective first extension portions 40 and the second extension portion 42 configure weakened portions 44. The weakened portions 44 are set with lower mechanical strength and rigidity with respect to load (bending load and compressive load) from the vehicle front side than the first extension portions 40 and the second extension portion 42.

Moreover, vehicle rear side ends of the first extension portions 40 and the second extension portion 42 are each at substantially the same position in the vehicle front-rear direction. The radiator support 38 previously described serves as a vehicle structural member that is disposed at the vehicle rear sides of the first extension portions 40 and the second extension portion 42.

The length direction of the radiator support 38 runs in the vehicle width direction, and the radiator support 38 has a substantially rectangular tube shaped cross-section profile as sectioned in a direction orthogonal to the vehicle width direction. The mechanical strength of the radiator support 38 with respect to bending load and the like, and in particular the mechanical strength of the radiator support 38 with respect to load from the vehicle front side, is higher than that each of the first extension portions 40 and the second extension portion 42. A vehicle front side face of the radiator support 38 opposes respective vehicle rear side faces of the first extension portions 40 and the second extension portion 42 in the vehicle front-rear direction across a predetermined vehicle front-rear direction spacing.

Example of Strength Settings of First Extension Portions 40 and Second Extension Portion 42

Next, explanation follows regarding an example of mechanical strength settings of the first extension portions 40 and the second extension portion 42 of the bumper reinforcement 10 according to the present exemplary embodiment with respect to bending load, compressive load, and the like, with reference to FIG. 2 and FIG. 3. Note that the grille shutter section 24 is omitted from illustration in FIG. 2 and FIG. 3.

Modes in which load acts on the bumper reinforcement 10 from the vehicle front side include frontal collisions in which the vehicle collides with an obstacle at the vehicle front side. Such frontal collisions include what are referred to as offset collisions, in which a location further toward one vehicle width direction side than the vehicle width direction center of the vehicle collides with the obstacle, and what are referred to as full overlap frontal collisions, in which the vehicle front end section of the vehicle collides with the obstacle substantially uniformly over the vehicle width direction. Collision testing is performed in anticipation of both collision modes.

In offset collision testing, a barrier 46 corresponding to an obstacle collides with a location on the vehicle width direction left side of the vehicle width direction center of the vehicle. The barrier 46 collides at a predetermined speed (for example 64 km/h) with the location within a range spanning from the vehicle left side end of the vehicle body of the vehicle to a position at 40% of the overall vehicle width direction length. A collision load F1 from the barrier 46 in this collision is input to the bumper reinforcement body base 14 of the bumper reinforcement body 12 through a vehicle member configuring a location further toward the vehicle front side than the bumper reinforcement 10.

In the offset collision testing, as described above, the barrier 46 collides with the location within a range spanning from the vehicle left side end of the vehicle body of the vehicle to a position at 40% of the overall vehicle width direction length. In the present exemplary embodiment, the vehicle left side first extension portion 40 is set within this range spanning from the vehicle left side end of the vehicle front side end section of the vehicle body to the position at 40%. Accordingly, in the offset collision testing described above, the collision load F1 is input to a location further toward the vehicle front side than the vehicle left side first extension portion 40 of the bumper reinforcement body base 14 (namely, the input position of the collision load F1 on the bumper reinforcement body base 14 is controlled). Note that the mechanical strength of the weakened portion 44 between the vehicle left side first extension portion 40 and the second extension portion 42 of the bumper reinforcement body base 14 with respect to bending load and the like is set such that the weakened portion 44 will deform by for example cracking in the vicinity of a vehicle left side end portion in such offset collision testing.

Due to the bumper reinforcement body base 14 deforming at the weakened portion 44 in this manner, the bumper reinforcement body base 14 is displaced toward the vehicle rear side by the collision load F1. The vehicle rear side end of the vehicle left side first extension portion 40 accordingly abuts the vehicle front side face of the radiator support 38, such that the vehicle left side first extension portion 40 is supported from the vehicle rear side by the radiator support 38. In this state, the vehicle left side first extension portion 40 is sandwiched between the bumper reinforcement body base 14 and the radiator support 38 in the vehicle front-rear direction. The collision load F1 on the vehicle left side first extension portion 40 therefore acts mainly as a compressive load in the vehicle front-rear direction.

Note that in the present exemplary embodiment, the vehicle left side first extension portion 40 has the mechanical strength (mechanical strength with respect bending load, compressive load, and the like) not to deform or the like under the collision load F1 acting on the vehicle left side first extension portion 40 in such offset collision testing. The vehicle right side first extension portion 40 has mechanical strength equivalent to that of the vehicle left side first extension portion 40. Accordingly, movement of the bumper reinforcement body 12 toward the vehicle rear side under the collision load F1 of the magnitude generated in offset collision testing is roughly limited to the spacing between the vehicle rear side end of the vehicle left side first extension portion 40 and the vehicle front side face of the radiator support 38.

On the other hand, in full overlap frontal collision testing, the vehicle front end section of the vehicle collides with the barrier 46 at a predetermined speed (for example 55 km/h) substantially uniformly over the vehicle width direction. A collision load F2 from the barrier 46 in such a collision is transmitted to the bumper reinforcement body base 14 of the bumper reinforcement body 12 substantially uniformly over the length direction of the bumper reinforcement body base 14 (the vehicle width direction).

Consider now a configuration in which the bumper reinforcement body base 14 is not provided with the second extension portion 42. In such a configuration, the collision load F2 is input substantially uniformly to the bumper reinforcement body base 14 from the vehicle front side, and causes the bumper reinforcement body 12 to move or deform until the vehicle rear side ends of the two first extension portions 40 abut the vehicle front side face of the radiator support 38. When this occurs, the two vehicle width direction side end portions of the bumper reinforcement body base 14 are supported by the respective first extension portions 40. In this state, rotational moments M1, M2 toward the vehicle width direction center and the vehicle rear side (namely rotational moments M1, M2 attempting to displace the vehicle width direction center side portion of the bumper reinforcement body base 14 toward the vehicle width direction center and vehicle rear side with respect to the two vehicle width direction end portions thereof) act on the bumper reinforcement body base 14, the rotational moments M1, M2 being substantially centered on the vehicle front side end portions of the first extension portions 40 with axial directions running substantially in the vehicle vertical direction.

However, in the present exemplary embodiment, the second extension portion 42 has sufficient mechanical strength (for example compressive strength) not to deform under a load F3 (for example a compressive load) based on the rotational moments M1, M2 described above in full overlap frontal collision testing. The mechanical strength of the weakened portions 44 of the bumper reinforcement body base 14 with respect to bending load, compressive load, and the like is set to a level such that the weakened portions 44 deform under the collision load F2 in full overlap frontal collision testing. Accordingly, movement of the bumper reinforcement body 12 toward the vehicle rear side under the collision load F2 of roughly the magnitude that arises in full overlap frontal collision testing is roughly limited to the separation between the vehicle rear side ends of the two first extension portions 40 and second extension portion 42, and the vehicle front side face of the radiator support 38.

Operation and Advantageous Effects of the Present Exemplary Embodiment

In the bumper reinforcement 10 (or the grille shutter section 24), the respective mechanical strengths of the first extension portions 40, the second extension portion 42, and the weakened portions 44 of the bumper reinforcement body 12 are set as described above. Accordingly, even if the vehicle is involved in an offset collision roughly consistent with the collision load F1 in the offset collision testing described above, or in a full overlap frontal collision roughly consistent with the collision load F2 in the full overlap frontal collision testing described above, movement of the bumper reinforcement 10 (or the grille shutter section 24) toward the vehicle rear side under the collision load F1 or F2 can be roughly limited to the spacing between the first extension portions 40 and second extension portion 42, and the radiator support 38.

In cases in which the collision load F1 or F2 is greater than the collision load F1 or F2 of the corresponding offset collision testing or full overlap frontal collision testing described above, the two first extension portions 40, the second extension portion 42, and the two crash boxes 20 undergo compression deformation. The collision load F1 or F2 is partially absorbed in the compression deformation of the two first extension portions 40, the second extension portion 42, and the two crash boxes 20. This enables movement of the bumper reinforcement 10 (or grille shutter section 24) toward the vehicle rear side in a vehicle frontal collision to be effectively suppressed.

Due to setting the mechanical strengths of the first extension portions 40, the second extension portion 42, and the weakened portions 44 as described above, there is no need to set the mechanical strength of the bumper reinforcement body 12 higher than necessary. This enables a reduction in weight of the bumper reinforcement body 12, and thus a reduction in weight of the bumper reinforcement 10 (or the grille shutter section 24). This enables the advantageous effect of the light weight of the bumper reinforcement 10 (or the grille shutter section 24), obtained by integrally molding the bumper reinforcement 10 (or the grille shutter section 24) from a synthetic resin material, to be more fully exploited.

Note that although the first extension portions 40 and the second extension portion 42 are solid in the present exemplary embodiment, any one of the first extension portions 40 or the second extension portion 42 may have a hollow tube profile, or may have a C-shaped cross-section profile opening toward one vehicle vertical direction side or one vehicle width direction side.

Moreover, in the present exemplary embodiment the bumper reinforcement body 12 has a C-shaped cross-section profile opening substantially toward the vehicle rear side. However, the bumper reinforcement body 12 may have a solid profile, may have a tube shaped profile, or may have a C-shaped cross-section profile opening in a direction other than toward the vehicle rear side.

Moreover, in the present exemplary embodiment, the grille shutter section 24 is provided at the vehicle upper side of the bumper reinforcement body base 14 of the bumper reinforcement body 12. However, the grille shutter section 24 may be provided at the vehicle lower side of the bumper reinforcement body base 14. Alternatively, bumper reinforcement bodies 12 may be respectively provided at both vehicle vertical direction sides of the grille shutter section 24. Configuration may also be made in which the grille shutter section 24 is omitted.

Moreover, the present exemplary embodiment is described as the bumper reinforcement 10 including the grille shutter section 24. However, the present exemplary embodiment may be understood as the grille shutter section 24 including the bumper reinforcement body 12.

What is claimed is:

1. A bumper reinforcement comprising:
a bumper reinforcement body that is molded from a synthetic resin material, a length of the bumper reinforcement body extending in a vehicle width direction;
a first extension portion that is integrally molded with the bumper reinforcement body so as to extend from the bumper reinforcement body toward a vehicle rear side and oppose a vehicle structural member extending in the vehicle width direction from a vehicle front side, the first extension portion being provided within a range spanning from a vehicle width direction side end portion to a position at 40% of an overall vehicle width direction length of a vehicle front end section away from the vehicle width direction side end portion;
a second extension portion that is integrally molded with the bumper reinforcement body so as to extend from the bumper reinforcement body toward the vehicle rear side and oppose the vehicle structural member extending in the vehicle width direction from the vehicle front side, the second extension portion being provided further toward a vehicle width direction center than the range spanning from the vehicle width direction side end portion to the position at 40% of the overall vehicle width direction length of the vehicle front end section; and
a weakened portion provided at the bumper reinforcement body between the first extension portion and the second extension portion and having a lower bending strength with respect to load acting in a vehicle front-rear direction than the first extension portion and the second extension portion.

2. The bumper reinforcement of claim 1, wherein:
the bumper reinforcement body includes a bumper reinforcement body side section extending further toward a vehicle width direction outer side than the first extension portion; and
the bumper reinforcement body side section is disposed at a vehicle front side of a crash box and opposes the crash box, the crash box being configured to deform, in a case in which load from the vehicle front side exceeds a predetermined magnitude, and being positioned at the vehicle front side.

* * * * *